INVENTOR.
William G. Kirchhoff
BY
Murray and Zugelter
ATTORNEYS

May 10, 1938.  W. G. KIRCHHOFF  2,116,930
DOUGH MOLDER
Filed Dec. 16, 1935  3 Sheets-Sheet 3

INVENTOR.
William G. Kirchhoff
BY
ATTORNEYS

Patented May 10, 1938

2,116,930

UNITED STATES PATENT OFFICE 2,116,930

DOUGH MOLDER

William G. Kirchhoff, Cincinnati, Ohio, assignor to The J. H. Day Company, Cincinnati, Ohio, a corporation of Ohio Application December 16, 1935, Serial No. 54,586

7 Claims. (Cl. 107—9)

This invention relates to improvements in a dough molding apparatus, which ordinarily comprises sheeting means, sheet curling rolls, and a loaf elongating means of one kind or another.

An object of the invention is to provide a molding apparatus of the kind referred to, wherein the sheeting and curling head is shiftable bodily longitudinally of the machine frame, in the direction of the loaf elongating means, for the effective handling of various kinds and sizes of dough lumps.

Another object of the invention is to provide, in a machine of this character, a new type and arrangement of curling means which prevents "hopping" of the curled sheet and subsequent presentation of the resultant roll of dough to the elongating means in a cocked or oblique position; which insures the formation of a tighter roll of dough during the curling operation; and which discharges the rolled or curled sheet to the mouth of the elongating means substantially centrally thereof, or midway between its side limits.

Another object of the invention is to provide a simple, accurate and durable irreversible means for adjusting the sheeting rolls, and which means may include an automatic compensator for variations of slack occurring in the power transmission means whenever the sheeting rolls are readjusted.

Another object is to provide a sheeting roll adjustment which cannot be altered by vibration, or forces other than are deliberately applied for the adjusting operation, so that the machine will operate continuously without attention.

In general, it is an object of this invention to provide a dough molder which is superior to any heretofore known and used, from the standpoint of flexibility of use upon all kinds and types of doughs, and upon all ordinary sizes of loaves.

The foregoing and other objects are attained by the means described herein and disclosed in the accompanying drawings, in which.

Figure 1:
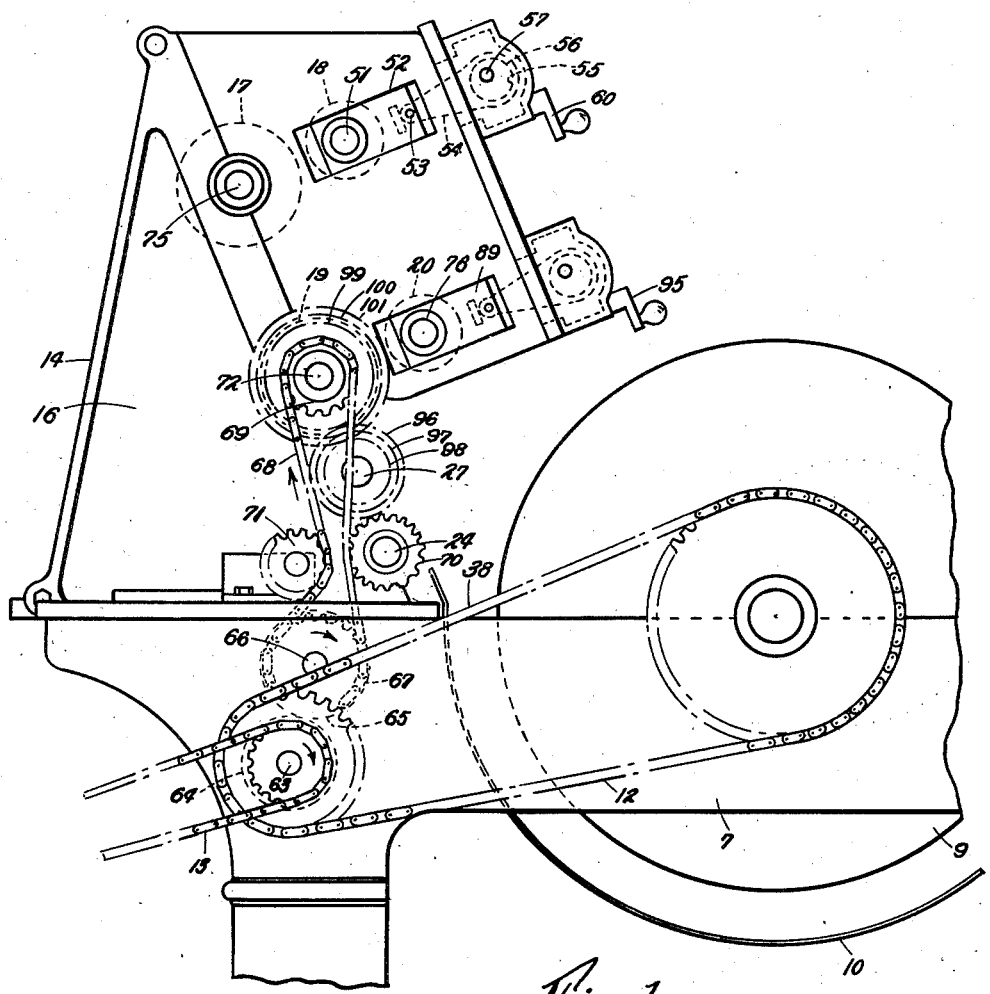
Fig. 1 is a fragmental side elevation of the improved dough molder.

In general, the machine of this invention comprises a bed or frame having side rails 7 and 8 spaced apart to support between them a rotatable loaf rolling drum 9 and a stationary pressure board 10 spaced therefrom as indicated in Fig. 1. The pressure board is shown conventionally only, as its specific construction is of no concern to the present invention. The drum and pressure board together provide what is known as a loaf elongating means, and such means may be of various forms other than that illustrated, so far as the invention is concerned. The drum may be rotated by means of a suitable chain and sprocket arrangement 12—13, from a suitable motor or other source of power, not shown. The rails or sides 7 and 8 of the frame are adapted to support a sheeting and curling head 14 having a pair of side plates 15 and 16. Mounted upon suitable transverse shafts journaled in the side pieces of the head, are the sheeting rolls 17, 18, 19 and 20, to which rolls are fed measured or weighed lumps of dough in succession. The lumps thus fed into the head of the machine are rolled and flattened into sheet form by means of the sheeting rolls. To accomplish this, it will be understood, the sheeting rolls 17 and 19 rotate in a clockwise direction, whereas the sheeting rolls 18 and 20 rotate counter-clockwise. The driving means for these rolls will be described hereinafter.

Figure 5:
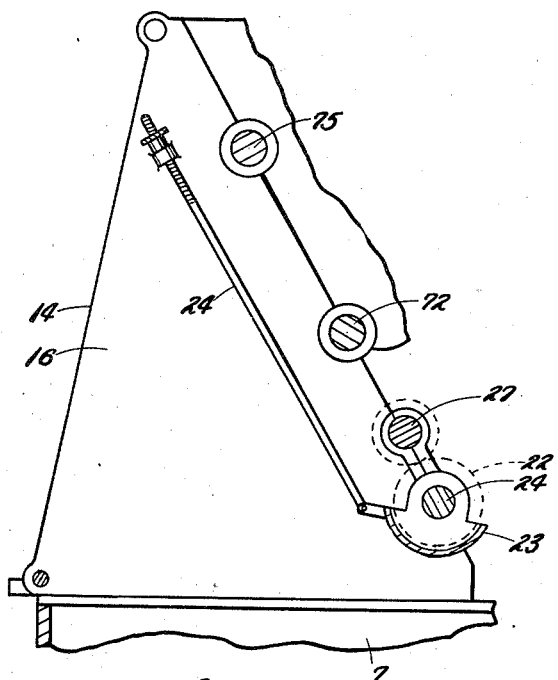
Fig. 5 is a fragmental cross-sectional view taken on line 5—5 of Fig. 4.

Beneath the lower set of sheeting rolls is an upper curling roll 21 and a lower curling roll 22, both of which curling rolls are rotated in a counter-clockwise direction (see Figure 5) for the purpose of rolling the sheet presented thereto by the sheeting rolls, so as to form a loaf constituted of a series of convolutions of sheeted dough. It is believed unnecessary to go into further detail as to the particular manner in which the curling rolls perform their intended function as all of that has been fully disclosed in my previously issued patents, namely No. 1,828,049 dated October 20, 1931 and No. 1,867,223 dated July 12, 1932. It may be observed that the present structure includes a curling roll guard or loaf guide 23 and a means 24 for shifting the guide circumferentially about the lower curling roll, with the axis of its shaft 24 as a center, all as disclosed in my prior patents above referred to, and for the purposes therein explained.

It will be understood that the behavior of the curled sheets as they are formed on the curling rolls is determined largely by the speed of the curling rolls, and by the consistency and the type of dough fed to the machine. Accordingly, a baker who uses a single dough molder for operation upon different kinds and types of dough, should be enabled to adjust the machine in such a manner that it will effectively handle the various types and kinds of dough. The adjusting means herein described provides means whereby the entire head of the machine may be shifted toward and from the mouth 38 of the loaf elongating means.

Figure 2:
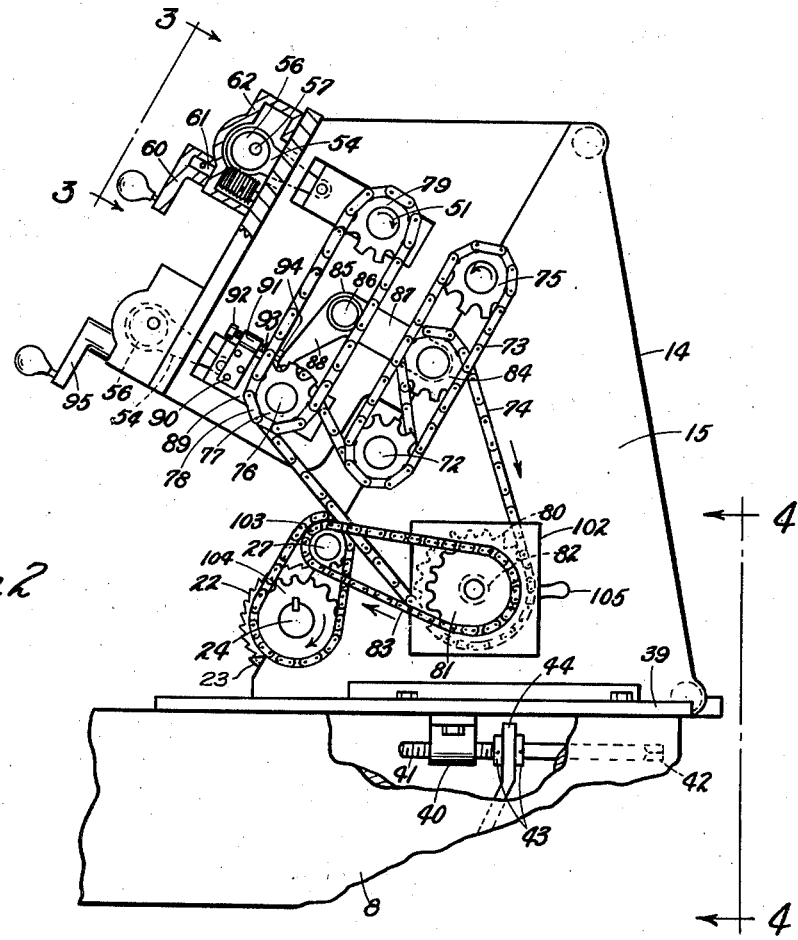
Fig. 2 is an elevational view of the side of the machine opposite to that illustrated by Fig. 1.
Figure 4:
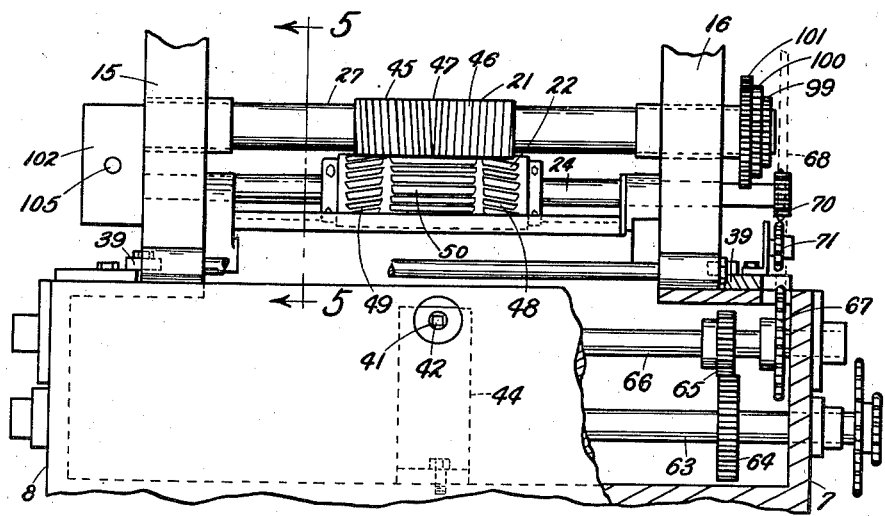
Fig. 4 is a rear view taken on line 4—4 of Fig. 2.

One form of satisfactory means for shifting the entire head of the machine relative to the frame or bed thereof, is shown in Fig. 2, wherein the character 39 represents a guide for the movable head, said guide being duplicated at opposite sides of the machine as indicated in Fig. 4. To the under side of the head is bolted or otherwise fixedly mounted, an internally threaded nut 40 through which extends a threaded screw 41, said screw having a rearwardly extended end 42 which is squared or otherwise formed to receive a tool whereby the screw may be rotated. Intermediate the ends of the screw are fixed a pair of collars or the like 43 which preclude longitudinal movement of the screws relative to a supporting bracket 44 which is fixed stationarily upon the frame 8, or to some other stationary part of the machine. By referring to Fig. 2, it should readily be understood that rotation of the screw 41 in opposite directions will advance or retract the entire head 14, thereby to move the curling means closer or further from the mouth of the loaf elongating apparatus. Thus it should be evident that both curling rolls may be advanced and retracted with respect to the mouth of the loaf elongating means. By means of this adjustment, it is possible to condition the machine for handling different types and consistencies of dough, as well as different sizes of loaves formed on the curling rolls.

It will be noted that the curling rolls move bodily with the head of the machine as is evident by reference to the structural details disclosed in Fig. 4. As the shafts of the sheeting rolls are carried by the head of the molder, the sheeting rolls also move bodily with the head upon manipulation of the screw 41.

From the illustration of Fig. 4, it will be observed that the upper curling roll 21 has its face corrugated or grooved by forming thereon a right hand thread 45 and a left hand thread 46, which threads meet at the middle of the roll, as indicated by the character 47. The effect of these oppositely directed threads upon a cylindrical mass of dough which is in contact therewith is to automatically center the cylindrical mass with respect to the curling rolls, thereby to prevent the cylindrical mass from running lengthwise toward one end of the curling roll and to be subsequently discharged into the elongating means with one of its ends closer to one edge of the drum than to the other edge of the drum. The result just mentioned, that is, the centering of the cylindrical mass with respect to the curling rolls and to the elongating means, is bound to occur because a cylindrical mass in frictional contact with the right and left hand threads of the upper curling roll, will be forced lengthwise by that screw thread which has the most threads in contact upon the dough mass, and the mass will naturally assume a center position when the number of left hand threads and the number of right hand threads in contact upon the cylindrical mass, is equal.

The lower roll 22 is provided with a series of end flutes 48 and 49, between which is formed a series of middle flutes 50. The upper and lower curling rolls are so arranged that the meeting line of the right and left hand threads of the upper curling roll, is directly above the center line of the middle flutes 50. The series of end flutes 48 and 49 are oblique to the horizontal flutes of the series 50 so that any tendency of the cylindrical loaves to hop while riding upon the horizontal flutes 50, will be overcome by the oblique flutes 48 and 49. All of the flutes of the lower curling roll have a cross-sectional shape similar to that of a circular saw, and the direction of rotation is such that the radial faces of the flutes perform a lifting action upon the cylindrical loaves or the sheets from which said loaves are formed. (See Fig. 2.)

With upper and lower curling rolls constructed and related in the manner above described, the sheets which are fed by the sheeting rolls are curled very tightly, and the completely curled mass, before leaving the curling rolls, is accurately centered with respect to the mouth of the elongating means, so that the loaf enters the elongating means with its ends equally spaced from the sides of the drum 9. Moreover, the particular construction of the lower curling roll prevents hopping of the loaf during the curling operation, and also any premature discharge of the loaf into the elongating means.

It is to be understood that speeds of rotation of the curling rolls may be varied in the present device, in accordance with the teaching of the Kirchhoff Patent No. 1,867,223, dated July 12, 1932. In fact, it is desirable that some form of means for altering the rate of rotation of both of the curling rolls be provided, as will hereafter appear.

Means are provided on the dough molder, for securing an inexpensive, trouble-free and effective adjustment of the sheeter rolls 18 and 20 toward and from the sheeter rolls 17 and 19 respectively. Such means for both of the sheeter rolls 18 and 20 are identical, so that a description of one will suffice for the other also. Roll 18, for example, has its shaft 51 journaled in a longitudinally slidable bearing block 52, to which block is pivoted at 53 one end of a connecting rod 54. The opposite end of the connecting rod is bored or otherwise provided with a transverse circular opening 55 in which is rotatably supported an eccentric 56. The eccentric may be in the form of a circular disc, mounted upon a transverse shaft 57 with its center offset from the center of the shaft. By referring to Fig. 1, it will be evident that rotation of the shaft 57 to which the eccentric 56 is fixed, will result in longitudinal shifting of the connecting rod 54 and the bearing block 52 to which it is pivoted.

Figure 3:
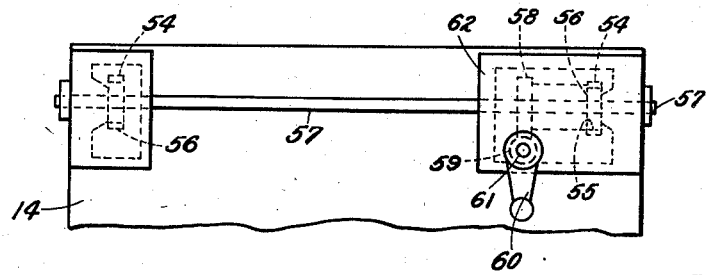
Fig. 3 is a fragmental plan view taken on line 3—3 of Fig. 2, showing the new sheeter roll adjustment.

Referring now to Fig. 3, the character 58 indicates a worm wheel which, like the eccentric 56, is fixed to the shaft 57. The worm wheel is preferably of fine pitch, and a similarly pitched worm 59 to be rotated by means of a handle 60, engages the worm wheel 58 for slowly rotating the shaft 57 upon manipulation of the handle 60. It will be understood that the handle 60 and the worm 59 are both pinned or otherwise fixed upon a stub shaft 61 which projects from the housing 62 that encloses the gearing and the eccentric. By referring to Fig. 3, it will be evident that the shaft 57 extends across the head of the machine, to actuate a complementary eccentric and associated connecting rod 54, for adjustment of the bearing block at the opposite side of the machine. Thus, by means of the single handle 60, the bearing blocks of the opposite ends of the roll 18, are adjusted simultaneously. By providing the worm and worm wheel 58 and 59 with teeth of a fine pitch, the sheeting roll adjustment is rendered irreversible in the sense that no amount of vibration at the roll 18 or its bearing 52 can result in rotating the handle 60 and thereby alter the adjustment of the sheeting rolls. The lower sheeting roll 20 is provided with an adjustment means identical with that above described in connection with the upper sheeting roll 18.

Referring to Fig. 1, the driven shaft 63 carries a gear 64 which drives a meshing gear 65, the shaft 66 of the latter having fixed thereon a sprocket 67. A chain 68 passing over the sprocket 67, drives the sprocket 69 and shaft 72 of sheeter roll 19. Said chain 68 also passes over the idler sprocket 70 which is loose upon the shaft 24 of the lower curling roll. The sprocket 71 also is an idler. The direction of rotation of the various sprockets and rolls, is indicated by means of arrows.

The shaft 27 of the upper curling roll carries a series of gears 96, 97, and 98, which mesh, respectively, with the gears 99, 100, and 101, carried by the shaft 72 of the sheeter roll 19. These gears furnish the driving means for the upper curling roll, and they function as a variable speed drive therefor as disclosed in the previously mentioned Kirchhoff Patent No. 1,867,223, to which patent the reader is referred for details of the variable speed drive.

It will be noted that the shaft 72 which carries the sprocket 69 has its opposite end (reference to Fig. 2), provided with suitable sprockets for driving the chains 73 and 74. Chain 73 drives the sprocket 75 of the sheeter roll 17. Chain 74 drives the shaft 76 of sheeter roll 20, and said shaft 76 carries a sprocket 77 that drives a chain 78 for the sprocket 79 of the shaft 51, which is the shaft of sheeter roll 18. Chain 74 drives also a sprocket 80, which through any suitable type of change speed mechanism in the housing 102, drives a sprocket 81. From the sprocket 81 extends a chain 83 for driving a double sprocket which idles on the upper curling roll shaft 27, and from which extends a chain 103 for driving the sprocket 104 of the lower curling roll. The construction just described provides a variable speed drive for the lower curling roll, through the medium of the change gear device indicated conventionally by the character 102. The change gear device may be of any approved construction, controllable by means of a handle or lever 105, or it may conveniently take the form of the change gear means which drives the upper curling roll 21.

An idler sprocket 84 over which the chain 74 passes, forms part of the automatic compensator for variations of slack occurring in the chain 74 whenever the sheeting roll 20 is readjusted. Said automatic compensator consists of a bell crank 85 pivoted upon the side of the head as at 86. One arm 87 of the bell crank carries the idler sprocket 84, and the other arm 88 is adapted to be moved conjointly with the slidable bearing block 89 of the sheeting roll 20. Although the free end of arm 88 may be pivotally attached directly to the bearing block 89, or to shaft 76, or to some movable part such as 54 or 56, it is considered desirable to provide an adjustable connection between said arm 88 and the sliding bearing block 89. Such adjustable connection may be in the form of a bracket 90 fixed to the outer face of the bearing block 89, said bracket having an internally threaded portion 91 providing a nut for a threaded screw 92 inserted into one end of the internally threaded portion 91 and a second threaded screw 93 inserted into the opposite end of the internally threaded portion 91. The head 94 of the second screw 93, is adapted to abut the free end of arm 88, so as to maintain a tightened condition of chain 74. The two screws or bolts 92 and 93 are adapted to lock upon one another within the internally threaded portion of 91 of bracket 90. Should it be necessary to tighten the chain 74 by means of the adjustment 92—93, the screw 93 would be backed out of the internally threaded boss 91 to the extent necessary, and then locked in position by means of the screw 92. The adjustment just described is seldom disturbed, as it is used only in the event of wear in the links of the chain 74. The automatic compensator, however, is in reality an adjustment means which comes into use whenever the setting of the lower sheeting rolls is altered. Thus, should the bearing block 89 be advanced by means of the adjusting handle 95, the sprocket 77 would move toward the shaft 72 and tend to loosen the chain 74. Such loosening of the chain, however, would at the same time be prevented by the upward movement of the bell crank arm 87 which carries the sprocket 84. Accordingly, every movement of the sliding bearing 89 is accompanied by a movement of the bell crank, which complementarily adjusts the positions of sprockets 77 and 84 in such a manner as to maintain a given tension of chain 74.

With further reference to the curling rolls, it may be stated that the right and left hand threads of roll 21 may be shallow or deep, and they need not actually meet as indicated at 47, because the desired result may be secured by merely providing a few threads at each side of the roll. The lower curling roll also may take different forms, such as would result from omitting or reducing the extent of the middle flutes 50, and extending the oblique flutes 48 and 49 toward the middle of the roll. Various other modifications and changes could be made in the structural details of the device, and such are to be understood as falling within the scope of the following claims, wherever sufficiently broad terminology permits.

What is claimed is:

1. A sheeting head for dough working machinery, comprising a series of sheeting rolls at least one of which is adjustable bodily toward and from another, a sprocket associated with each sheeting roll, a bodily movable bearing for the adjustable sheeting roll, an idler sprocket adapted for movement relative to the sprockets of the sheeting rolls, a chain drive for all the sprockets, and means actuated by the bodily movable bearing, for shifting the idler sprocket to maintain a predetermined tension of the chain drive for the sprockets of the sheeting rolls.

2. In a dough handling apparatus, the combination of a rotatable lower curling roll, and an upper rotatable curling roll, arranged for receiving and curling a sheet of dough fed thereto, means for rotating said rolls in a common direction of rotation, and right and left hand threads on one of the curling rolls, said threads substantially meeting at a location intermediate the ends of said one curling roll, and obliquely related steps on the other roll directed outwardly of the middle portion of said other roll, to support a curled sheet eliminating the hopping tendency common to fluted rolls.

3. In a dough handling apparatus, the combination of a rotatable lower curling roll, and an upper rotatable curling roll, arranged for receiving and curling a sheet of dough fed thereto, means for rotating said rolls in a common direction of rotation, obliquely related steps on one of the curling rolls, the planes of said steps being so related that imaginary extensions thereof would meet intermediate the roll ends, and right and left hand threads on the other curling roll, said threads running toward the middle portion of said other roll.

4. In a dough handling apparatus, the combination of a rotatable lower curling roll, and an adjacent upper rotatable curling roll, arranged for receiving and curling a sheet of dough fed thereto, means for rotating said rolls in a common direction of rotation, a series of parallel steps on the lower curling roll, a series of other steps at opposite sides of said first mentioned steps, and disposed obliquely thereto, and right and left hand threads on the upper curling roll each running toward the middle portion of the upper roll, the rolls being arranged for rotation in spaced parallelism with one above the other.

5. A machine roll for curling plastic sheets, comprising a substantial cylinder having opposite bearing ends, and right and left hand threads on said roll, said threads substantially meeting at a location intermediate the ends of the roll and directed toward said ends.

6. A curling roll for operating upon plastic sheets, comprising a substantially cylindrical body having opposite ends, and obliquely related steps on said body, the planes of said steps being so related that imaginary extensions thereof would meet intermediate the roll ends.

7. A curling roll for operating upon plastic sheets, comprising a substantially cylindrical body having opposite ends, a series of parallel steps on said body extending lengthwise thereof, and a series of other steps at opposite sides of said first mentioned steps, and disposed obliquely thereto.

WILLIAM G. KIRCHHOFF.